Figure 1:
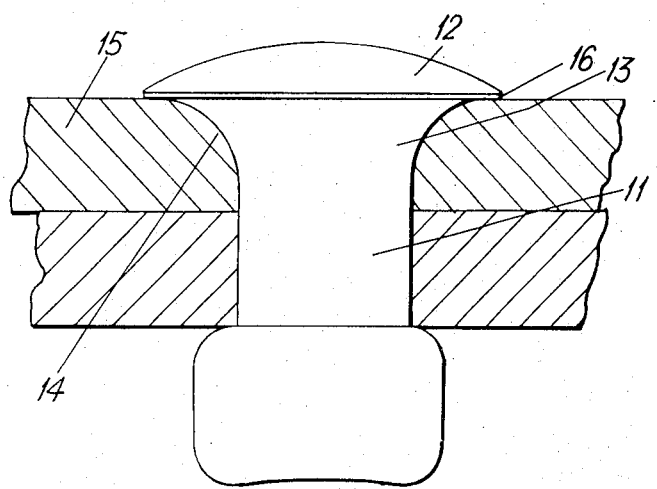

United States Patent

[11] 3,630,116

| [72] | Inventor | Robert Henry Travell Harper<br>Knebworth, England |
|---|---|---|
| [21] | Appl. No. | 883,964 |
| [22] | Filed | Dec. 10, 1969 |
| [45] | Patented | Dec. 28, 1971 |
| [73] | Assignee | Hawker Siddeley Aviation Limited<br>Kingston-upon-Thames, Surrey, England |
| [32] | Priority | Jan. 9, 1969 |
| [33] | | Great Britain |
| [31] | | 1,474/69 |

[54] RIVET
3 Claims, 2 Drawing Figs.

[52] U.S. Cl................................................... 85/37,
287/189.36 F
[51] Int. Cl...................................................... F16b 19/06
[50] Field of Search............................................ 287/189.36
F; 85/37, 28

[56] References Cited
UNITED STATES PATENTS 3,512,446  5/1970  Sekhon......................287/189.36 F X

FOREIGN PATENTS 17,569  1889  Great Britain................  85/37

OTHER REFERENCES

Fasteners, Winter 1962/63, pages 8 & 9 cited.

*Primary Examiner*—Thomas F. Callaghan
*Assistant Examiner*—Wayne L. Shedd
*Attorney*—Dowell & Dowell ABSTRACT: A rivet is provided of which the head is convex but of a height considerably reduced in comparison with that of a conventional hemispherical head, and the necessary thickness of head metal is obtained in the regions of the head periphery by flaring out the rivet shank in a smooth curve to meet the convex head at the head periphery, at which periphery there is a very short cylindrical surface instead of a sharp edge. At a distance one-third of the way out from the normal shank diameter to the maximum head diameter the full depth of the head, including the portion due to the flare out of the shank, is approximately equal to the depth of a conventional countersunk rivet head at the same diameter.

PATENTED DEC28 1971

3,630,116

Inventor
Robert Henry Travell Harper
By
Dowell of Dowell
Attorneys

RIVET

This invention relates to headed securing elements and joints made therewith, especially rivets and riveted joints.

The traditional riveted joint has rivets with hemispherical heads; but in some work the rivet head protuberances are a considerable disadvantage. In aircraft construction, for instance, rivet heads on the exterior of the airframe are not only unsightly but they also involve a not insignificant drag penalty. Both these disadvantages can be overcome by employing countersunk rivet heads but only at the expense of the strength of the joint, particularly from the fatigue aspect. It is therefore an object of the invention to provide a riveted joint in which the above-mentioned disadvantages are to a large extent overcome without any substantial weakening of the joint and without resorting to the use of thicker sheets.

According to the present invention, each rivet or other headed securing element has a convex head but with a height above the plate surface that is considerably reduced from the height of a conventional hemispherical head, and adequate thickness of head is obtained in the regions near its periphery by forming the shank under the head with a diameter that increases progressively toward the head from the normal diameter of the shank to the diameter of the head. If the rivet shank is flared out in smoothly curved fashion, the change in diameter is achieved without any abrupt discontinuity in the internal profile of the rivet hole which would otherwise be a source of weakness. The radius of curvature of this flaring of the shank is not especially critical but may be substantially equal to the thickness of the plate.

Figure 2:
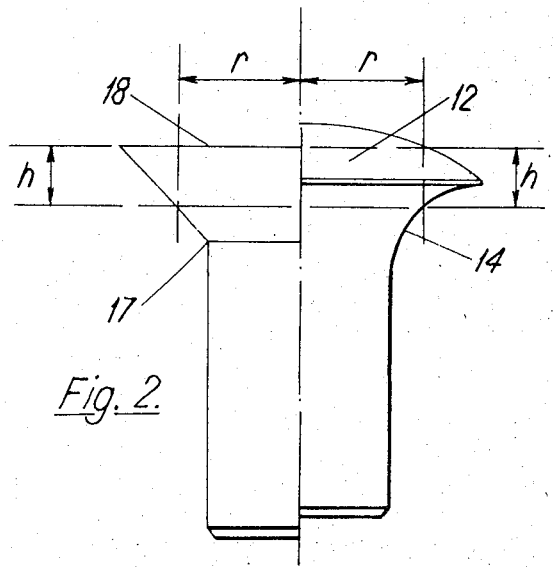

One form of joint in accordance with the invention is illustrated by way of example in the accompanying drawings, in which:

FIG. 1 is a cross-sectional view through a joint with a rivet according to the invention, and FIG. 2 shows a comparison of this rivet with a conventional countersunk rivet.

FIG. 1 shows a rivet 11 securing together two overlapped plates of equal thickness and having a head 12 of convex form but much less deep than a conventional hemispherical rivet head. Under the head 12 the rivet shank 13 flares out in a smooth curve 14 from the normal shank diameter to the diameter of the head. In the example shown, the radius of the curve 14 is equal to the thickness of one plate 15. The rim of the rivet head where the flaring shank meets the convex surface of the head 12 is not a sharp edge but has a very short substantially cylindrical surface 16 of, say, 2 to 5 thousandths of an inch depth in a ⅛ inch rivet. When the rivet is used, a portion of this rim surface 16 may become sunk below the surface of the plate 15. FIG. 2 shows a comparison between the rivet and a conventional countersunk rivet of the same diameter. The countersunk rivet is of adequate strength in itself but its use results in a substantial loss of metal from the plate in accommodating the rivet heads and, more important, a sharp discontinuity in the profile of the rivet hole at the point 17, from which point a tear or fatigue crack in the metal of the plate may start. In the rivet according to the invention, the smooth flare curve 14 avoids the discontinuity 17 so that there is no source of weakness due to this. However, if the rivet now had a flat-topped head like the head 18 of the countersunk rivet, the marginal regions of the head would be quite thin and of inadequate strength. By making the top of the head of shallow convex form these marginal regions are thickened up.

If we consider the rivet head at a radius $r$ intermediate the shank radius and the maximum head radius, the countersunk rivet has a depth of head $h$ at this radius. A countersunk rivet head with a flare curve 14 and a flat top would, at the radius $r$, have a depth only something like a third of this, but the convex head 12 is provided to bring the depth back to the value $h$, as indicated on the right-hand side of the diagram of FIG. 2. For the purpose of designing the new rivet, the radius $r$ may be chosen to be a third of the way from the shank radius to the maximum head radius. The depth $h$ at this radius need not be exactly the same as for a countersunk rivet of the same size but it should be approximately the same.

Although the head of the new rivet still projects from the surface of the plate it is found in practice that the finished appearance is neat and attractive, in contrast to the lumpy appearance of the rivet bulges of hemispherical heads. If desired, the top surface of the head need not be of the same curvature throughout but it could have a flattened central region, so long as the depth of the marginal regions is maintained. Another possibility is that the strength of the joint may be improved if the rivet hole in the top plate is not fully cut out to the curved profile shown, leaving some metal in the hole to be peened on or before riveting, so that after the joint is made some metal is under compressive stress.

Although in the example described above the rivet has a solid shank, it will be understood that the principle of the invention can be applied equally to hollow rivets. Moreover, similar considerations apply in the case of other types of headed securing elements, such as bolts.

What I claim is:

1. A rivet, or like-headed securing element, having a substantially convex head but with a height above the surface of the plate to be secured that is considerably less than the height of a conventional hemispherical head, a shank that, in the region where it joins the head, flares out in smoothly curved fashion from the normal diameter of the shank to the diameter of the head, the radius of curvature of the flare being substantially equal to the thickness of each plate to be secured, and wherein, at a diameter one-third of the way out from the normal shank diameter to the maximum head diameter, the depth of the head including the portion due to the flaring of the shank is approximately equal to the depth that a normal flat-topped countersunk head would have at the same diameter.

2. A rivet, or like-headed securing element, according to claim 1, wherein the rim of the head where the flared shank meets the convex surface of the head is not a sharp edge but is in the form of a very short cylindrical surface.

3. A rivet, or like-headed securing element, according to claim 1, wherein the convex head has a flattened central region.

* * * * *